US011942733B2

(12) United States Patent
Naaman

(10) Patent No.: US 11,942,733 B2
(45) Date of Patent: Mar. 26, 2024

(54) SAFETY MECHANISM FOR ELECTRICAL OUTLETS

(71) Applicant: Laith A. Naaman, Cupertino, CA (US)

(72) Inventor: Laith A. Naaman, Cupertino, CA (US)

( * ) Notice: Subject to any disclaimer, the term of this patent is extended or adjusted under 35 U.S.C. 154(b) by 298 days.

(21) Appl. No.: 17/244,739

(22) Filed: Apr. 29, 2021

(65) Prior Publication Data

US 2021/0249825 A1 Aug. 12, 2021

Related U.S. Application Data

(63) Continuation of application No. 16/236,103, filed on Dec. 28, 2018, now Pat. No. 11,043,776.

(60) Provisional application No. 62/580,883, filed on Nov. 2, 2017.

(51) Int. Cl.

*H01R 13/70* (2006.01)
*H01H 71/00* (2006.01)
*H01R 33/945* (2006.01)
*H01R 13/713* (2006.01)

(52) U.S. Cl.

CPC ............ *H01R 13/70* (2013.01); *H01H 71/00* (2013.01); *H01R 13/713* (2013.01); *H01R 33/945* (2013.01)

(58) Field of Classification Search

CPC .... H01R 13/70; H01R 13/713; H01R 33/945; H01H 71/00
USPC .......................................................... 307/326
See application file for complete search history.

(56) References Cited

U.S. PATENT DOCUMENTS

| | | | |
|---|---|---|---|
| 2,792,561 | A | 5/1957 | Cohen |
| 3,131,013 | A | 4/1964 | Carlson |
| 3,775,727 | A | 11/1973 | Wise |
| 3,985,412 | A | 10/1976 | Hoffman |
| 3,997,225 | A | 12/1976 | Horwinski |
| 4,897,049 | A | 1/1990 | Miller et al. |
| 4,955,213 | A | 9/1990 | Ohsugi et al. |
| 5,383,799 | A | 1/1995 | Fladung |
| 5,621,277 | A | 4/1997 | Ricca |
| 6,309,248 | B1 | 10/2001 | King |
| 7,214,101 | B1 | 5/2007 | Tong |
| 7,357,652 | B1 | 4/2008 | Arenas et al. |
| 7,695,293 | B1 | 4/2010 | Sikes |
| 8,187,011 | B1 | 5/2012 | Baldwin et al. |
| 8,864,505 | B2 | 10/2014 | Chuang |

(Continued)

FOREIGN PATENT DOCUMENTS

CA 2478072 C * 8/2011 ............ H02J 7/0034

*Primary Examiner* — Michael R. Fin
(74) *Attorney, Agent, or Firm* — Polsinelli LLP

(57) ABSTRACT

The present disclosure is directed to preventing serious injury or death by electrocution due to contact with a power source, such as an alternating current (AC) voltage source. Methods and apparatus consistent with the present disclosure may controllably provide an electrical voltage to an electrical conductor for a period of time and then remove that voltage from the electrical conductor before providing the electrical voltage to the electrical conductor a second time. By initially connecting the electrical voltage to the conductor, then removing that electrical voltage from the conductor before re-connecting that electrical voltage to the conductor, methods and apparatus consistent with the present disclosure allow a person to let go of the electrical conductor before the person is seriously injured or killed by an electrical shock in an instance where the body of the person is in physical contact with the electrical conductor.

18 Claims, 7 Drawing Sheets

(56) References Cited

U.S. PATENT DOCUMENTS

| | | | | |
|---|---|---|---|---|
| 10,790,607 | B2 | 9/2020 | Naaman | |
| 11,043,776 | B2 | 6/2021 | Naaman | |
| 2009/0195349 | A1 | 8/2009 | Frader et al. | |
| 2009/0319207 | A1 | 12/2009 | Koch | |
| 2011/0216453 | A1 | 9/2011 | Haines et al. | |
| 2012/0075759 | A1* | 3/2012 | Eaves | H02H 3/40 361/86 |
| 2014/0030898 | A1 | 1/2014 | Baldwin et al. | |
| 2014/0094044 | A1 | 4/2014 | Ward | |
| 2014/0162480 | A1 | 6/2014 | Schutte et al. | |
| 2014/0342589 | A1 | 11/2014 | Lin | |
| 2017/0184343 | A1* | 6/2017 | Freer | H02H 11/00 |
| 2018/0198821 | A1 | 7/2018 | Gopalakrishna | |
| 2020/0158069 | A1 | 5/2020 | Graham et al. | |

* cited by examiner

SAFETY MECHANISM FOR ELECTRICAL OUTLETS

CROSS-REFERENCE TO RELATED APPLICATIONS

The present patent application is a continuation and claims the priority benefit of U.S. patent application Ser. No. 16/236,103 filed Dec. 28, 2018, which claims the priority benefit of U.S. provisional patent application No. 62/580,883 filed Nov. 2, 2017, the disclosures of which are incorporated by reference herein.

BACKGROUND OF THE INVENTION

1. Field of Invention

The present invention generally relates to increasing the safety of an electrical power source. More specifically the present invention is directed to increasing the safety of electrical supplies, receptacles, or plugs.

2. Description of the Related Art

Electrocution is a significant hazard that can lead to injury or death of a person that contacts an energized (live) electrical conductor. Various devices have been developed to prevent persons from contacting an energized electrical conductor. For example, electrical outlets may be equipped with devices that cover electrical plug. In other instances, electrical outlets may include a circuit breaker or ground fault detection circuit that disconnects an energized electrical circuit when a greater than a threshold amount of current is drawn from an energized electrical connector. Even though, various forms of safety devices exist, serious injuries or death may occur even when currently available safety devices are used. Furthermore, it may be impossible to identify whether current being provided via an electrical conductor is being supplied to an electrical appliance or to a human person. For example, currents supplied to power LED light bulbs or compact fluorescent light (CFL) bulbs may be similar to currents that can shock and injure a human because an impedance associated with these types of bulbs may be similar to the impedance of a person.

Furthermore, electrical shocks are known to cause the muscles of a person to contract. If this happens when a person grabs an energized electrical contact, that person may not be able to let-go of the energized contact because the electrical shock can cause the muscles of the person to contract in a manner that cannot be controlled by the person, resulting in injury or death. What are needed are new forms of safety devices that protect persons from electrical shocks.

SUMMARY OF THE CLAIMED INVENTION

The presently claimed invention relates to a method, a non-transitory computer readable storage medium, or an apparatus executing functions consistent with the present disclosure for increasing the safety of an electrical source. An apparatus consistent with the present disclosure may include an electrical conductor, a switch coupled to the electrical conductor and to a voltage source, a current sensor, and a control circuit. In an instance where the control circuit receives an input, the control circuit may close the switch for a first period of time while the control circuit monitors an output of the current sensor when identifying that a current is passing through the electrical conductor when the switch is closed. The control circuit may then open the switch to remove the electrical voltage from the electrical conductor for a second period of time. After second period of time, the control circuit may then close the switch again to provide the electrical voltage to the electrical conductor after the second period of time.

A method consistent with the present disclosure may use a control circuit to close a switch to connect an electrical conductor with voltage source for a first period of time while the control circuit monitors an output of the current sensor when identifying that a current is passing through the electrical conductor when the switch is closed. This initial closing of the switch may be performed after an input of the control system changes state. The control circuit may then open the switch to remove the electrical voltage from the electrical conductor for a second period of time. After second period of time, the control circuit may then close the switch again to provide the electrical voltage to the electrical conductor after the second period of time.

When the presently claimed invention is implemented as a non-transitory computer-readable storage medium, a processor executing instructions out of the memory may perform steps consistent with the aforementioned method. As such, the processor executing instructions out of the memory may command the closure a switch to connect an electrical conductor with voltage source for a first period of time while the monitoring an output of the current sensor. The processor may then identify that a current is passing through the electrical conductor when the switch is closed. This initial closing of the switch may be performed after an input changes state at an input coupled to the processor. The control circuit may then command the switch to open to remove the electrical voltage from the electrical conductor for a second period of time. After the second period of time, the processor may command the switch to close again, such that the electrical voltage is provided to the electrical conductor after the second period of time.

DETAILED DESCRIPTION

The present disclosure is directed to preventing serious injury or death by electrocution due to contact with a power source, such as an alternating current (AC) voltage source. The main cause of such serious injury or death by electrocution, besides the electric current passing through the body, is the fact that the victim often cannot separate or “let go”, from the electrocuting wire or surface. The duration of an electrical shock to a victim is a significant factor. Methods and apparatus consistent with the present disclosure may controllably provide an electrical voltage to an electrical conductor for a period of time and then remove that voltage from the electrical conductor before providing the electrical voltage to the electrical conductor a second time. By initially connecting the electrical voltage to the conductor and then removing that electrical voltage from the conductor before re-connecting that electrical voltage to the conductor, methods and apparatus consistent with the present disclosure allow a person to let go of the conductor before the person is seriously injured or killed by an electrical shock in an instance where the body of the person is in physical contact with the electrical conductor.

Figure 1:
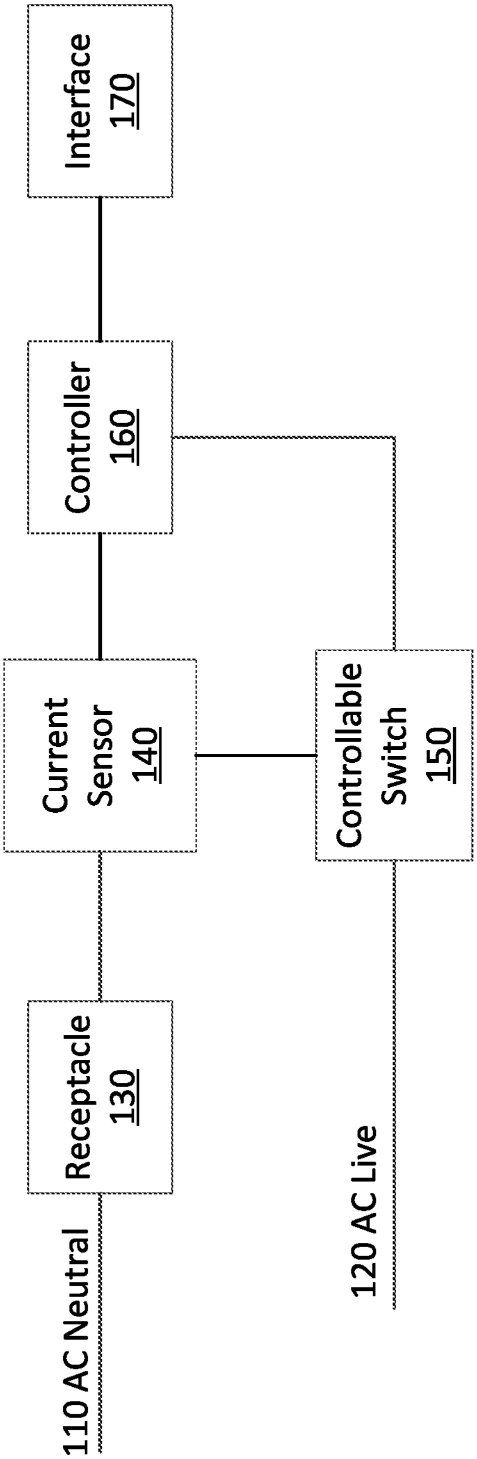
FIG. 1 illustrates an exemplary control circuit that may be used to control the distribution of a voltage to a receptacle.

FIG. 1 illustrates an exemplary control circuit that may be used to control the distribution of a voltage to a receptacle. FIG. 1 includes alternating current (AC) neutral input 110, AC live input 120, receptacle 130, current sensor 140, controllable switch 150, controller 160, and interface 170. Interface 170 may be device that sends a command to controller 160 that instructs controller 160 to energize receptacle 130. Interface 170 may itself include a switch. Interface 170 may be communicatively coupled to controller 160 by means that include a direct electrical connection, a digital communication bus, or a wireless communication interface.

When controller 160 receives the command to energize receptacle 130, controller 160 may engage (turn-on) controllable switch 150 for a first time period (one or more milliseconds or microseconds, for example) while the controller receives sensor data from current sensor 140. When the controller identifies that there is no electrical current detected based on data received data from current sensor 140, the controller 160 may de-energize receptacle 130. The presence of no current through the receptacle may indicate that an electrical load has failed (e.g. a light bulb has burnt out) or may indicate that no load is connected to or inserted into receptacle 130. The energizing of a receptacle when no load is connected to that receptacle may be considered as a potentially dangerous condition as a person could potentially contact an energized contact included in receptacle 130. As such, controller 160 may prevent receptacle 130 from being energized when it is not connected to a load. The fact that electrical power is not provided to a receptacle or outlet when no load is attached to that receptacle or outlet is not important because that receptacle or outlet is not currently connected to a working load.

Note that controller 160 is connected to current sensor 140 and to controllable switch 150. Using these connections controller 160 may control whether an electrical voltage is applied to receptacle 130 through current sensor 140 based on action of controllable switch 150, and controller 160 may receive sensor data from current sensor 140. Controllable switch 150 may be any form of switch known in the art and may include be or include a transistor, a field effect transistor (FET), a solid state relay, or a mechanical-inductive relay, for example. Controller 160 may be or include any form of control logic known in the art. As such controller 160 may include a processor and a memory, programmable logic, digital logic, or a field programmable gate array (FPGA). Controller 160 may include any of digital inputs, digital outputs, analog inputs, analog outputs, or a wireless communication device that may be used to perform a control function, that may be used to receive commands, or that may receive signals/data. Current sensor 140 may include or be any form of current sensor known in the art (analog or digital sensor). Current sensor 140 may include a resistor that drops a voltage that controller 160 may sense.

In an instance where controller 160 identifies that current is flowing during the first period of time based on received sensor data, controller 160 may turn off (de-energize) receptacle 130 after a second period of time (e.g. one or more seconds) before turning on (energizing) receptacle 160 again, this process could allow a person to let go of a energize-able electrical contact.

The control circuit of FIG. 1 thus may provide two different types of protection function: a first protection function that prevents an electrical receptacle or outlet from being energized when no load is attached to that receptacle/outlet, and a second protection function that allows a person to "let-go" of an energize-able wire, a contact, or a surface during or after a shock event. Apparatus consistent with the present disclosure solves a problem associated with the fact that electrical or electronic circuits have no way of identifying whether current is being provided to power an apparatus or that is currently being provide to shock a human person. This may be especially true when an impedance of a load is similar to the impedance of a human person.

Figure 2:
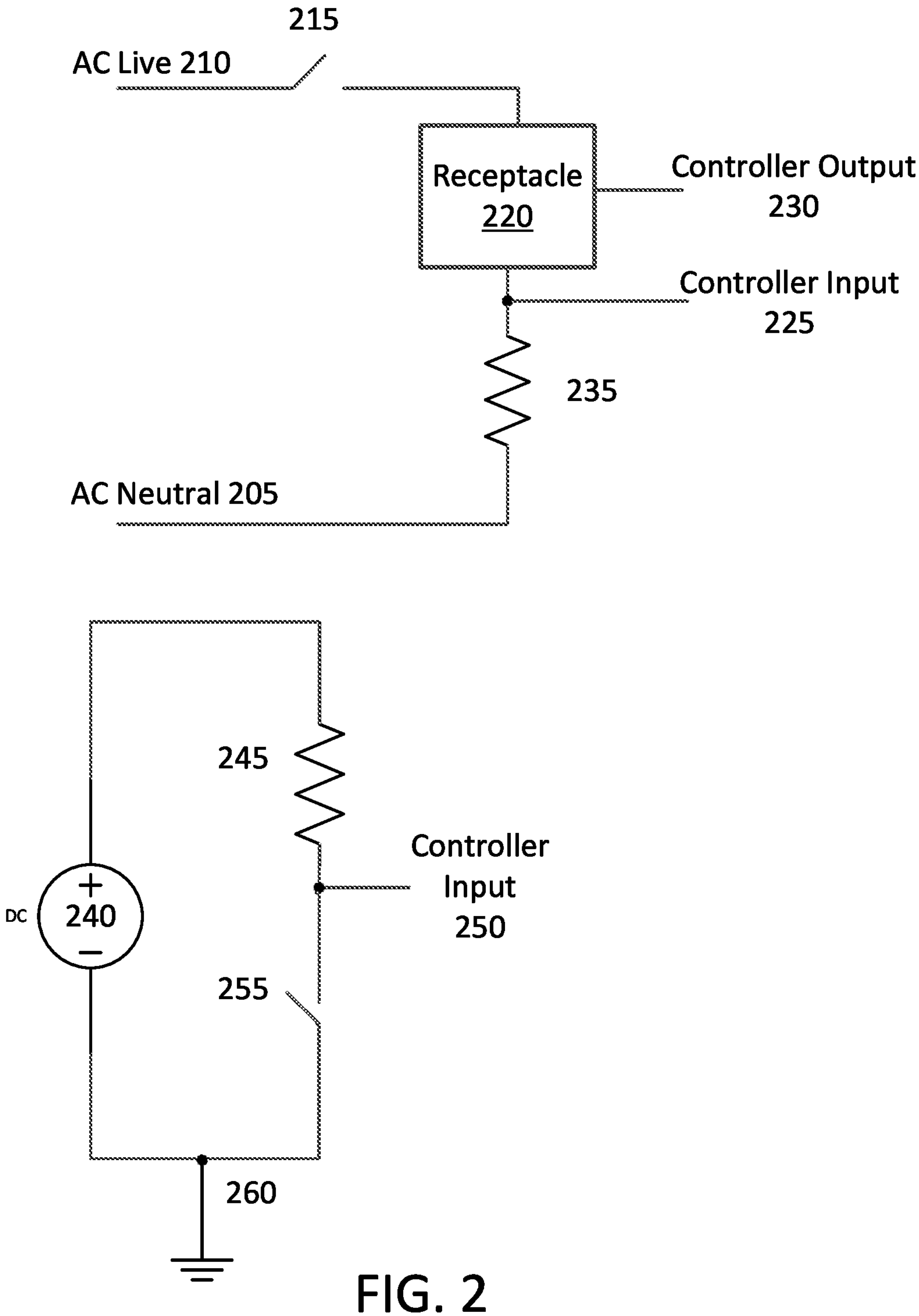
FIG. 2 illustrates exemplary circuits that may be directly coupled to a controller.

FIG. 2 illustrates exemplary switch circuits that may be directly coupled to a controller. A first switch circuit of FIG. 2 includes AC neutral input 205, AC Live 210 input, switch 215, receptacle 220, controller input 225, controller output 230, and resistor 235. When switch 215 is closed, a microcontroller may receive a low voltage AC signal dropped over resistor 235 via controller input 225. The microcontroller may use this low voltage AC signal to identify that the switch has been closed. The microcontroller may then use controller output 230 to de-energize and then re-energize receptacle 230 using a solid state relay or a switching device that may be included inside of receptacle 220, for example. In certain instances the low voltage AC signal provided to controller input 225 may be electrically isolated. For example, an optical isolator (not illustrated) may be used to electrically isolate the AC signal dropped across resistor 235 from an input pin on the controller.

FIG. 2 includes a second exemplary circuit in a direct current (DC) circuit configuration that may be coupled to a controller. The DC circuit in FIG. 2 includes DC power supply 240, resistor 245, switch 255, and controller input 250 that may be provided to an input of a controller. Note that a positive output of DC power supply 240 is electrically coupled to resistor 245. Note also that a negative output of DC power supply 240 is electrically coupled to ground 260 and to switch 255. When switch 255 is closed, a voltage at controller input 250 changes from a voltage equal to the DC power supply 240 voltage to a low voltage of zero volts. A microcontroller or a control circuit coupled to controller input 250 may use this change in voltage to trigger operations consistent with the present disclosure. When this voltage changes from the DC supply voltage 240 to ground potential, an electrical receptacle could be energized and de-energized.

To prevent any transients or glitches that may appear on controller input 250, this DC circuit could include a capacitor across (not illustrated) switch 255 that filters out electrical noise that may appear on controller input 250. Alternatively or additionally the controller may require that the voltage on controller input 250 be maintained for a period of time before the controller reacts to a change in voltage on controller input 250.

Figure 3:
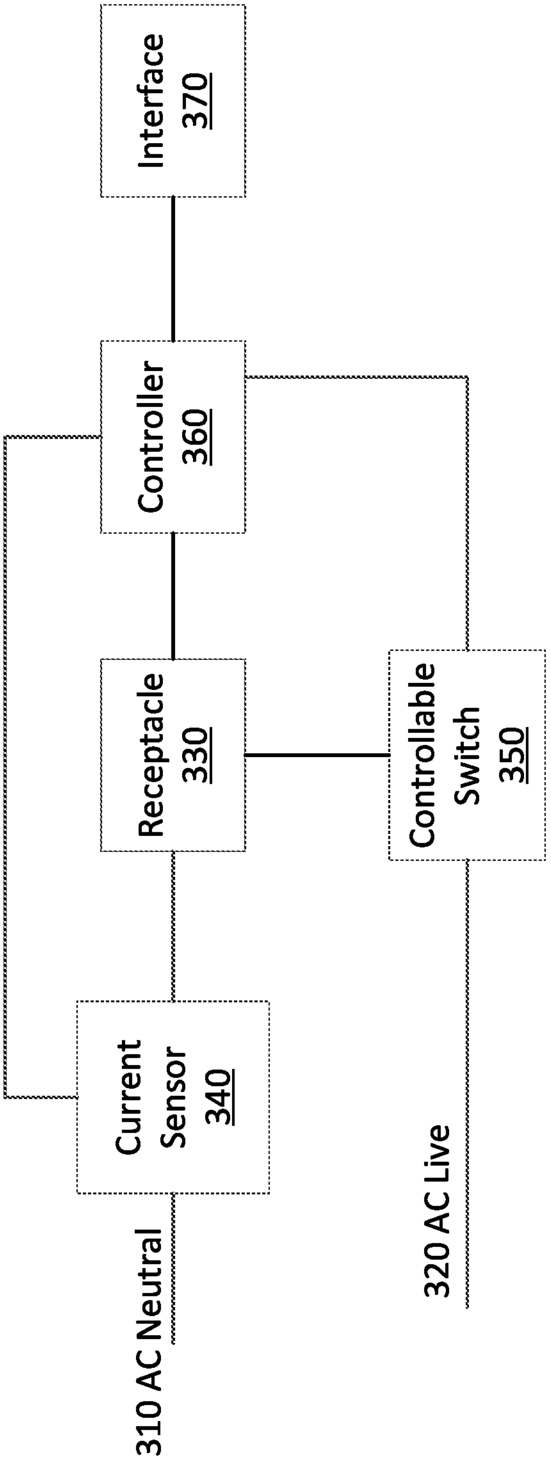
FIG. 3 illustrates a second exemplary control circuit that may be used to control the distribution of a voltage to a receptacle.

FIG. 3 illustrates a second exemplary control circuit that may be used to control the distribution of a voltage to a receptacle. FIG. 3 includes AC neutral input 310, AC Live input 320, current sensor 340, receptacle 330, controller 360, and interface 370. The circuit of FIG. 3 may operation in a similar manner to the circuit of FIG. 1 even though these two circuits have slightly different interconnection configurations. Note that controllable switch 350 is coupled directly to receptacle 330 and that current sensor 340 is coupled between receptacle 330 and AC neutral input 310. Current sensor 340 is also coupled to controller 360 and controller 360 is coupled to controllable switch 350 via one or more connections. A command from interface 370 may be used to instruct controller 360 to energize receptacle 330 in a manner consistent with one or more safety features described above in respect to FIG. 1. Interface 370 may be device that sends a command to controller 360 that instructs controller 360 to energize receptacle 330. Interface 370 may itself include or be a switch. Switch 370 may also be a momentary switch that provides a pulse when it is depressed. Interface 370 may be communicatively coupled to controller 360 by means that include a direct electrical connection, a digital communication bus, or a wireless communication interface.

Figure 4:
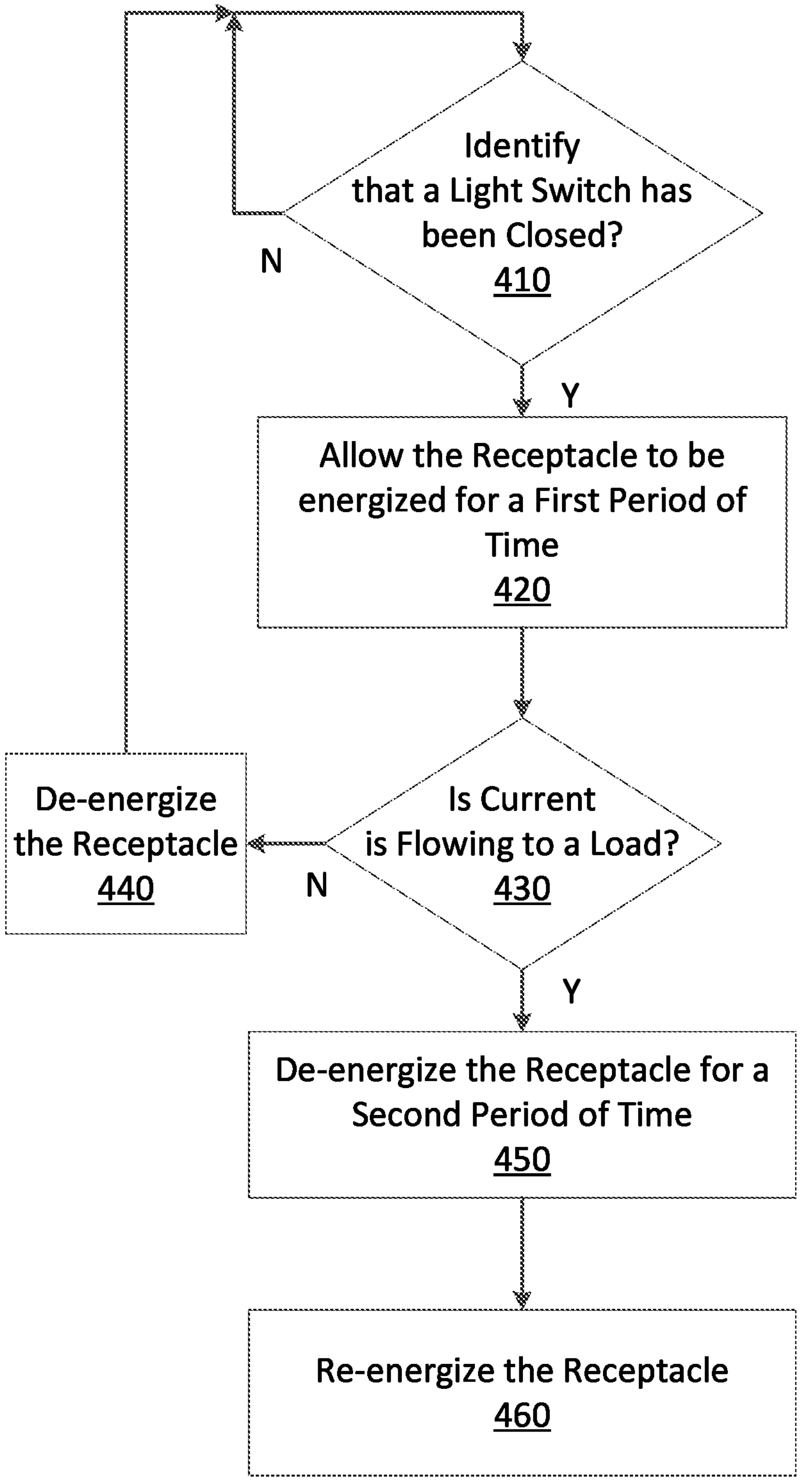
FIG. 4 illustrates a series of steps that may be performed by a controller consistent with the present disclosure.

FIG. 4 illustrates a series of steps that may be performed by a controller consistent with the present disclosure. FIG. 4 begins with determination step 410 that identifies whether a light switch has been closed, when the switch has not been closed flow of the method may move back to step 410, where the controller may once again identify whether the light switch has been closed. When step 410 identifies that the light switch has been closed, the flow of the method may move to step 420 where the receptacle is allowed to be energized for a first period of time. In step 430, the controller may identify whether current is flowing to a load during this first period of time. This identification may be performed by the controller receiving input or data from a sensor (whether that sensor be an analog or a digital sensor). When determination step 430 has identified that current is not flowing to a load during the first period of time, the method may move to step 440 where the receptacle is de-energized, after which flow of the method may move back to step 420 of FIG. 4. When determination step 430 identifies that current is flowing to the load, the flow of the method may move to step 450 where the receptacle is de-energized for a second period of time. After step 450, the receptacle may be re-energized in step 460 of FIG. 4. The de-energizing of the receptacle in step 450 of FIG. 4 may allow for a person that has received a shock from an energized conductor, wire, or surface to let go of that conductor, wire, or surface before that person is electrocuted.

Methods consistent with the present disclosure may include additional steps where the controller monitors information from a current sensor over time. In an instance where that current drops to zero amps, the controller may de-energize the receptacle based on the load no longer drawing current. The controller may additionally or alternatively monitor the current provided to the load and may de-energize the receptacle when a load current increases above a threshold level. Such an increase in load current may indicate a short circuit or a damaged load.

Figure 5:
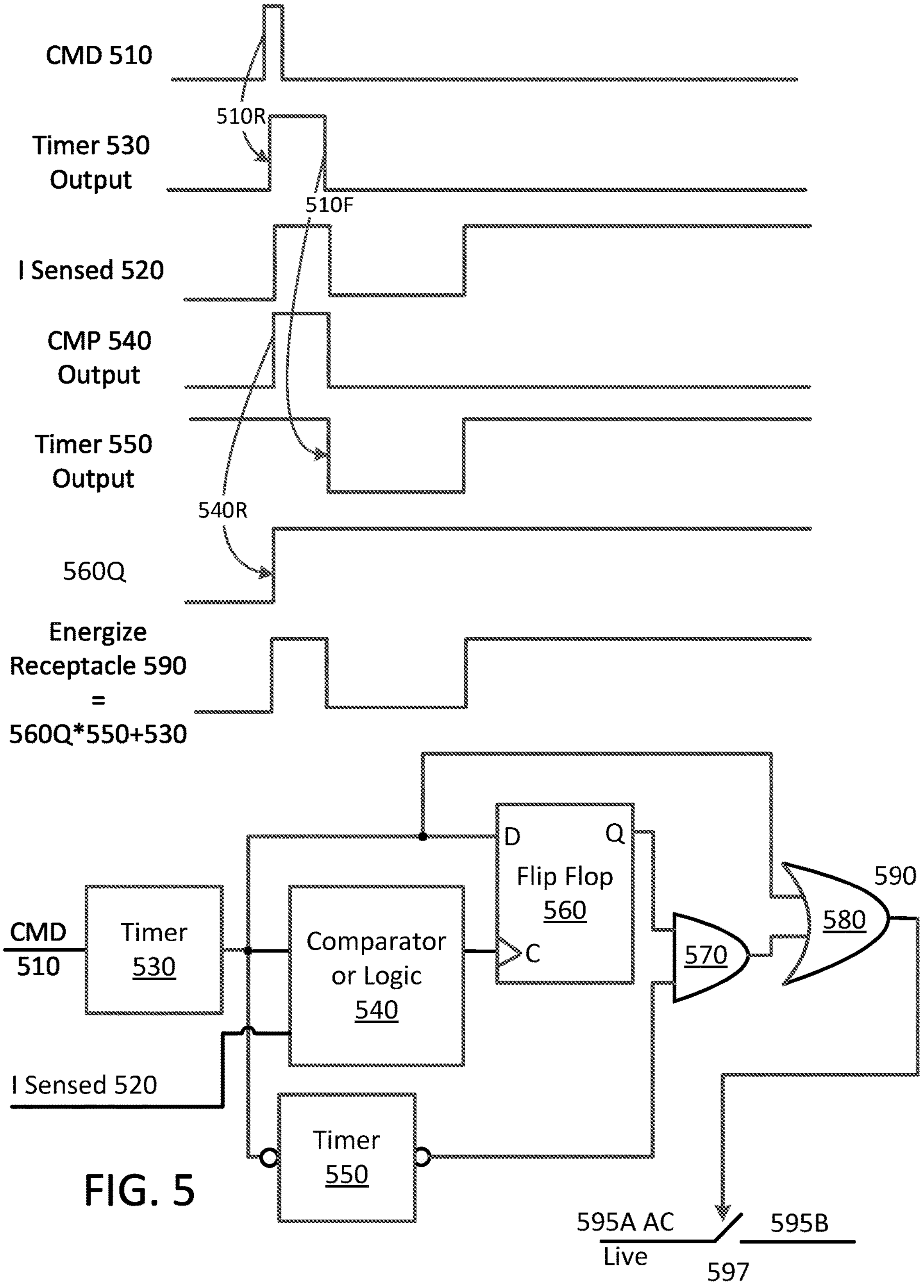
FIG. 5 illustrates an exemplary simplified circuit and timing diagram consistent with a controller of the present disclosure.

FIG. 5 illustrates an exemplary simplified circuit and timing diagram consistent with a controller of the present disclosure. The circuit diagram of FIG. 5 illustrates that embodiments of the present invention may be implemented with discrete parts. The circuit diagram of FIG. 5 includes a command CMD 510 input, a current (I) sensed signal 520 input, timer 530, comparator or logic 540, timer 550, flip flop 560, AND gate 570, OR gate 580, OR gate output 590 (energize receptacle), AC live input voltage 595A, and a connector 595B that may electrically connect to a pin of a receptacle when solid state relay 597 is commanded to conduct by a high state associated with OR gate output 590. Note that command input 510 is coupled to an input of timer 530. Note also that an output of timer 530 is coupled to a D (560D) input of flip flop 560, an input of OR gate 580, an input of comparator/logic 540, and an input of timer 550. Comparator/logic 540 includes two inputs one coupled to the output of timer 530 and another connected to current sensed signal 520. Comparator/logic 540 also includes an output coupled to a clock input C (560C) of flip flop 560. AND gate 570 has a first input coupled to output Q (560Q) of flip flop 560 and a second input coupled to timer 550. An output of AND gate 570 is coupled to an input of OR gate 580. Note that output 590 of OR gate 580 will transition to a high state when either an input from timer 530 or the input from AND gate 570 transitions to a high state. When OR gate output 590 transitions to a high state, switch 597 will close and an electrical voltage on AC live input 595A will be electrically coupled to connector 595B, energizing a receptacle consistent with the present disclosure.

The timing diagram of FIG. 5 illustrates how the circuit of FIG. 5 operates. The timing diagram of FIG. 5 illustrates a logic low (or zero "0") as signal at a low relative level and a logic high (or one, "1") when a signal is at a high level. This timing diagram also includes some, yet not all of the relationships that cause certain signals to change state in the timing diagram of FIG. 5. A rising edge 510R of CMD 510 causes an output of timer 530 to transition to a high state (logic 1) for a period of time. When the output of timer 530 output is in a high state the receptacle will be energized as controlled by OR gate output 590 according to the equation: 506Q*550+530 which at this time corresponds to a logic 1 at least because timer output 530 is set at a logic 1. The output of comparator or logic 540 transitions to a logic 1 state when both a current is sensed flowing to the receptacle and when the output of timer 530 is in a logic 1 state. The transitioning of output of comparator/logic 540 from a logic 0 state to a logic 1 state (as indicated by arrow 540R) causes the output of flip flop 560Q to transition to a logic 1 state.

After a first period of time, an output of timer 530 transitions to a logic 0 state, this transition causes an output of timer 550 to transition from a logic 1 state to a logic 0 state as indicated by arrow 510F, resulting in the receptacle being de-energized based on the formula 560Q*550+530=1*0+0=0. Then after a time period associated with timer 550, the output associated with timer 550 transitions back to the logic 1 state causing the receptacle to be energized again according to the formula 560Q*550+5303=1*1+0=1. While not illustrated in FIG. 5, control circuits consistent with the present disclosure may include additional components or logic that may cause the receptacle to be de-energized when current (I) sensed 520 transitions to a logic 0 state indicating that the load has either been turned off or has failed. Note that timers consistent with the present disclosure may be implemented by any means known in the art. As such, timer 530 and timer 550 may be "555" timing devices (e.g. 555 timers) known in the art or be or include digital logic or analog timing components that may include resistors, capacitors, or inductors, for example.

Figure 6:
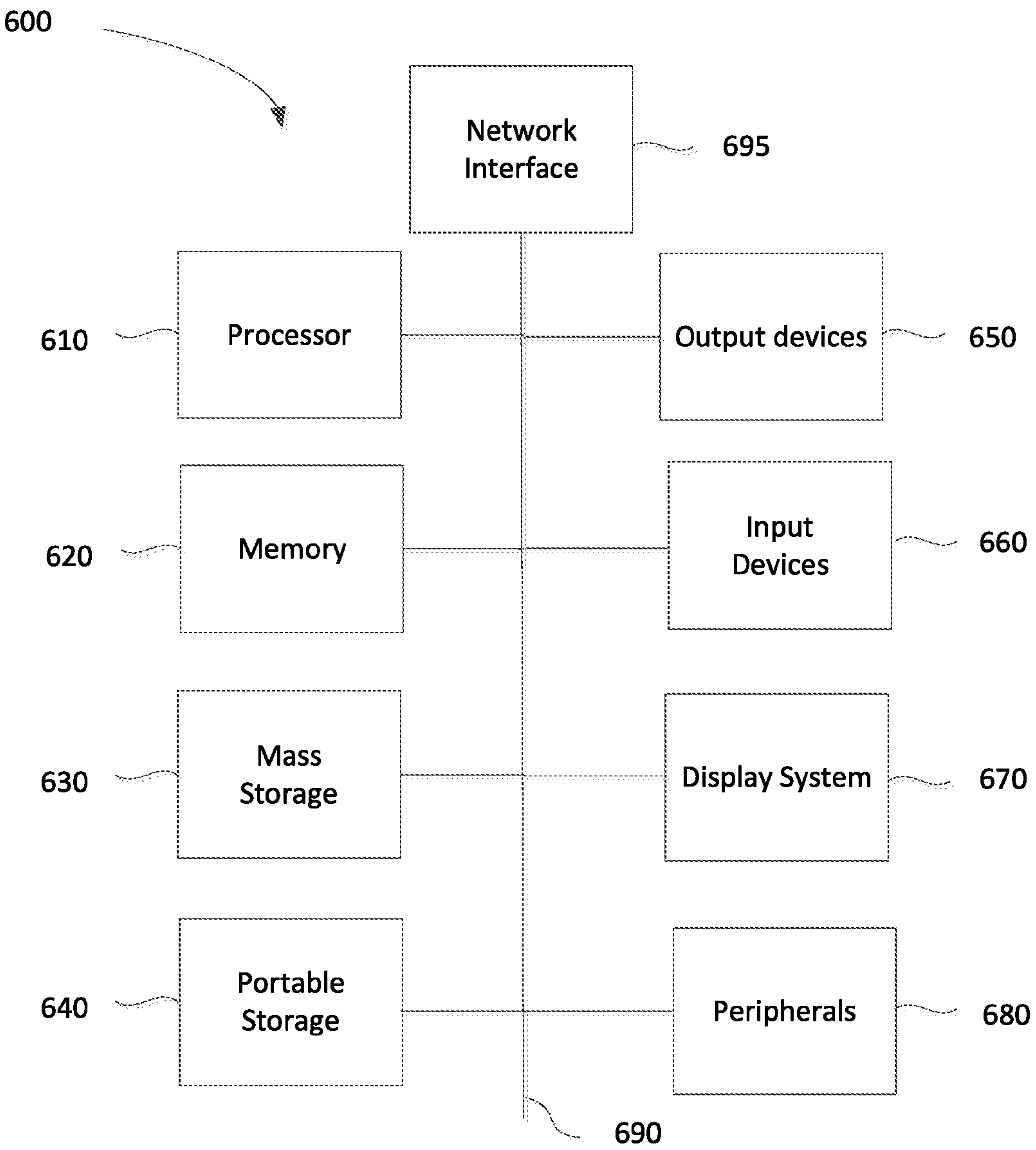
FIG. 6 illustrates a computing system that may be used to implement an embodiment of the present invention.

FIG. 6 illustrates a computing system that may be used to implement an embodiment of the present invention. The computing system 600 of FIG. 6 includes one or more processors 610 and main memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, peripheral devices 680, and network interface 695.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH memory, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors. Alternatively or additionally input devices 660 may include a digital input bus or an analog to digital converter coupled to a sensor.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

Network interface 695 may include any form of computer interface of a computer, whether that be a wired network or a wireless interface. As such, network interface 695 may be an Ethernet network interface, a BlueTooth™ wireless interface, an 802.11 interface, or a cellular phone interface.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 600 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

When a timer is implemented by a processor executing instructions out of a memory, a first number of clock cycles of a timing crystal associated with the processor may correspond to the first time based on the processor executing a instructions in a program loop that includes X number of loops. Similarly, a second number of clock cycles of the timing crystal associated with the processor may correspond to the second time based on the processor executing instructions in a program loop that includes Y number of loops.

Figure 7:
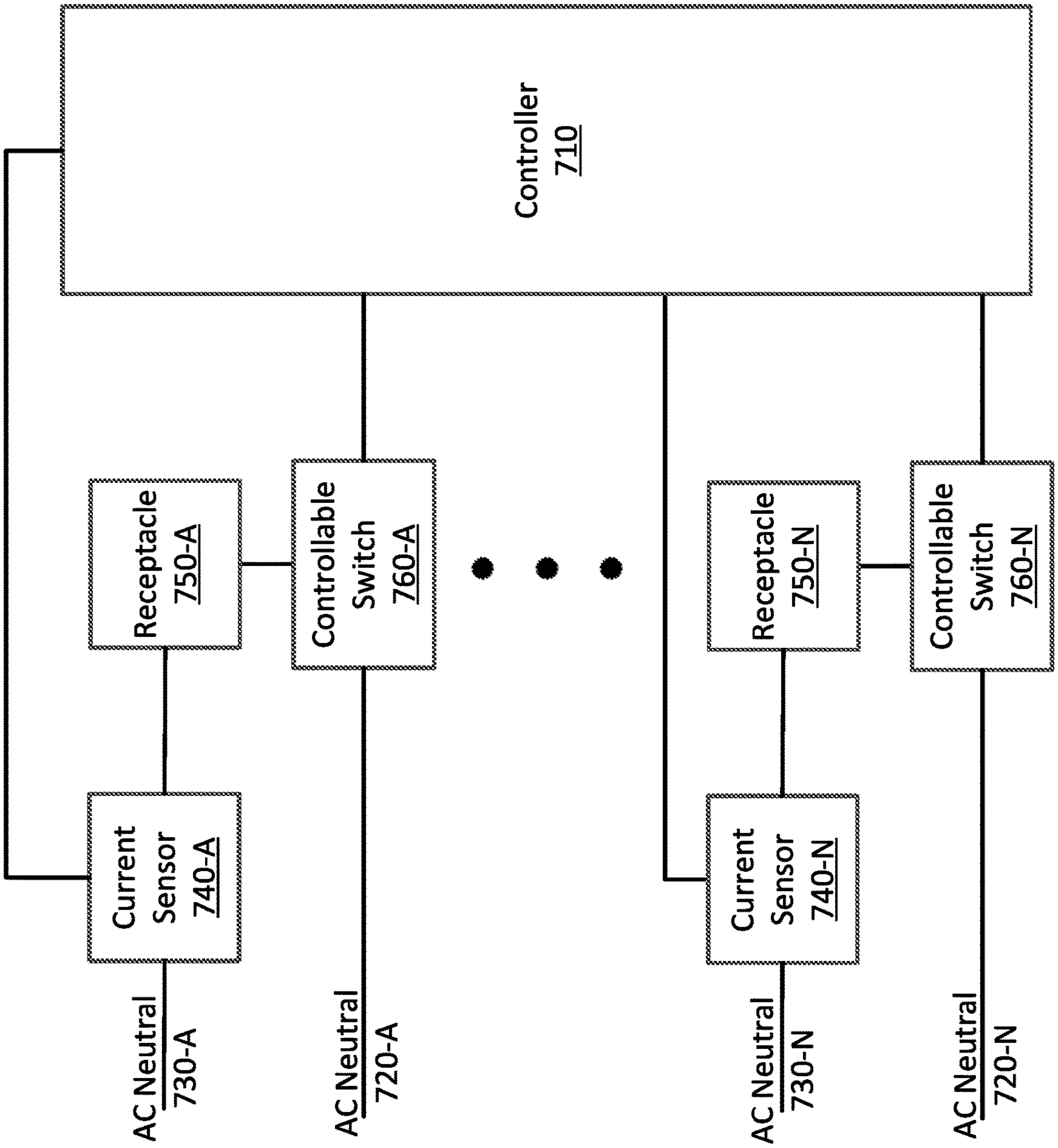
FIG. 7 illustrates an exemplary receptacle and electrical plug consistent with the present disclosure.

FIG. 7 illustrates several electrical receptacles controlled by a controller consistent with the present disclosure. FIG. 7 includes controller 710 coupled to each of a plurality of receptacle circuits that each include a AC Neutral input, an AC Live input, a current sensor, a receptacle, and a controllable switch. FIG. 7 illustrates different receptacle circuits that include current sensors 740-A through 750-N, controllable switches 760-A through 760-N, receptacles 750-A through 750-N may be controlled by controller 710. The AC Live inputs are identified as AC Live 720-A through 720-N and AC neutral inputs of FIG. 7 are identified as AC Neutral 730-A through 730-N. Each of these respective receptacle circuits may also be coupled to an on-off switch, such as the switches like those illustrated in respect to FIG. 2. A respective receptacle may be powered on or powered off according to the timing diagram of FIG. 4 or according to the flow chart of FIG. 4.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for increasing safety of an electrical source, the method comprising:

initiating a first state by a control circuit, wherein a conductor that distributes power from an alternating current (AC) voltage source is energized for a first controlled time period based on the first state being initiated by the control circuit in response to the closing of a single switch connected between the alternating current voltage source and a receptacle;

identifying a flow of electrical current through the conductor during the first controlled time period based on the conductor being energized, wherein a voltage associated with the first state and with the electrical conductor is a lower voltage than a voltage of the AC voltage source;

initiating a second state by the control circuit after the ending of the first controlled time period based on the identified flow of electrical current, wherein the single switch is opened for a second controlled time period disconnecting a portion of the electrical conductor at a single point of the conductor, the initiation of the second state resulting in a change to the voltage associated with the first state; and initiating the first state in response to the end of the second controlled time period, wherein the single switch is closed resulting in the voltage of the AC voltage source being provided to the conductor, wherein the first controlled time period is initiated based on an indication that the single switch is closed and the first state is initiated for a time period.

2. The method of claim 1, further comprising receiving a measure of the voltage associated with the first state that is lower than the voltage of the AC voltage source.

3. The method of claim 2, further comprising receiving by the control circuit the measure of the voltage associated with the first state via an optical isolated input.

4. The method of claim 1, further comprising closing the single switch that applies the first voltage to the conductor when the first state is initiated.

5. The method of claim 1, receiving a signal via an interface at the control circuit, wherein the initiation of the first state is based on receiving the signal at the interface.

6. The method of claim 5, wherein the signal is received wirelessly.

7. The method of claim 1, further comprising receiving an indication that a switch has been closed, wherein the initiation of the first time period is based on the receipt of the indication.

8. The method of claim 1, further comprising initiating a timer that controls a length of time the first controlled time period.

9. The method of claim 1, further comprising initiating a timer that controls a length of time of the second controlled time period.

10. An apparatus for increasing safety of an electrical source, the apparatus comprising:

a conductor that distributes power from an alternating current (AC) voltage source;

a control circuit that initiates a first state, wherein the conductor that distributes power from the AC voltage source is energized for a first controlled time period; and a sensor that senses a flow of electrical current through the conductor in response to the closing of a single switch connected between the alternating current voltage source and a receptacle during the first controlled time period resulting in the conductor being energized, wherein a voltage associated with the first state and with the electrical conductor is a lower voltage than a voltage of the AC voltage source, wherein the controller also:

initiates a second state by the control circuit after the ending of the first controlled time period based on the identified flow of electrical current, wherein the single switch is opened for a second controlled time period disconnecting a portion of the electrical conductor at a single point of the conductor, the initiation of the second state resulting in a change to the voltage associated with the first state, and initiate the first state in response to the end of the second controlled time period, wherein the single switch is closed allowing the voltage of the AC voltage source to be provided to the conductor.

11. The apparatus of claim 1, further comprising a voltage sensor that senses the voltage associated with the first state.

12. The apparatus of claim 11, further comprising receiving a measure of the first voltage from the voltage sensor.

13. The apparatus of claim 10, further comprising the single switch that applies the first voltage to the conductor when the first state is initiated.

14. The apparatus of claim 10, further comprising an interface of the control circuit that receives a signal, wherein the initiation of the first state is based on receiving the signal at the interface.

15. The apparatus of claim 14, wherein the signal is received wirelessly.

16. The apparatus of claim 1, an input that provides an indication that a switch has been closed, wherein the initiation of the first time period is based on the receipt of the indication.

17. The apparatus of claim 10, further comprising initiating a timer that controls a length of time the first controlled time period.

18. The apparatus of claim 10, further comprising initiating a timer that controls the length of time of the second controlled time period.

* * * * *